United States Patent [19]

Rawlins

[11] Patent Number: 5,393,537
[45] Date of Patent: * Feb. 28, 1995

[54] FISH ATTRACTANT AND SCENT MASKING COMPOSITION

[76] Inventor: Donald W. Rawlins, 224 Highland Dr., SW., Calhoun, Ga. 30701

[*] Notice: The portion of the term of this patent subsequent to Jan. 11, 2011 has been disclaimed.

[21] Appl. No.: 73,951

[22] Filed: Jun. 4, 1993

Related U.S. Application Data

[63] Continuation-in-part of Ser. No. 878,170, May 4, 1992, Pat. No. 5,277,918.

[51] Int. Cl.⁶ ............ A01K 85/00; A23L 1/325
[52] U.S. Cl. ............................... 426/1; 426/2
[58] Field of Search ............... 426/1, 2, 641, 643

[56] References Cited

U.S. PATENT DOCUMENTS

| | | | |
|---|---|---|---|
| 4,887,376 | 12/1989 | Sibley et al. | 426/1 |
| 4,927,643 | 5/1990 | D'Orazio et al. | 426/1 |
| 4,993,183 | 2/1991 | Carver | 426/1 |

FOREIGN PATENT DOCUMENTS

| | | | |
|---|---|---|---|
| 2045748 | 4/1972 | Germany | 426/1 |
| 3237747 | 10/1988 | Japan | 426/1 |

*Primary Examiner*—Arthur L. Corbin
*Attorney, Agent, or Firm*—Needle & Rosenberg

[57] ABSTRACT

The invention provides a penetrating scent/taste attractant for use on fishing lures. More particularly, a scent attractant is provided that actually penetrates the surface coating or the actual bait body. A combination of a scent attractant and a dye for application to a bait to provide a penetrating scent and a permanent color change simultaneously is also provided. Also provided is a formulation for the application of a scent attractant with or without a solvent-soluble dye, singularly dispersed or dissolved into a solvent capable of attacking the surface of an artificial bait and promoting a migration of either or both the fish-attractant and dye below the surface of the lure. A scent attractant and/or dye in combination with a water-insoluble polymer in a volatile solvent is also provided which is capable of forming a coating of scent attractant and/or a simultaneous color change to the surface of a metal or solvent-impermeable lure.

32 Claims, No Drawings

FISH ATTRACTANT AND SCENT MASKING COMPOSITION

This application is a continuation in part of U.S. Ser. No. 07/878,170, filed on May 4, 1992, now U.S. Pat. No. 5,277,918.

BACKGROUND OF THE INVENTION

Fishing is an increasingly popular sport, with over 75 million enthusiasts involved in the United States of America. The increasing amount of fishermen and the limited fishing waters lead the way for more innovative products and methods for increasing the fishing yield in this competitive sport. Many of these new products are related to the stimulation of the olfactory, visual, and even sound senses of fish and include a wide variety of products and application methods.

Fish, especially sport-fish, are generally attracted to smaller bait-fish and anything natural that falls into or lives in the water, such as insects, frogs, crawfish, and worms. Most new developments for artificial baits are new designs or variations of previous designs which better simulate an actual bait-fish or other natural food. New color combinations are also being constantly designed and applied to existing and new baits for visual stimulation of the fish.

Fish are attracted to baits by their keen sense of smell as well as by visual means. A variety of products designed to stimulate these senses is presently available. Among these products, scent attractants are commonly used to increase the likelihood of success. These scent attractants tend to be oil or water based and therefore need to be constantly reapplied to the bait. This reapplication is necessary because the oil or water-based material which dissipates as the formulation is washed away by the water. These scent attractant products are usually very messy to work with, often leaving behind oily residues on the fisherman and equipment.

Scent attractant products are also available in various other forms, such as in water-soluble polymers which attach themselves to the exterior coating of the lure as in U.S. Pat. No. 4,927,643. This type of polymer coating requires a longer drying time due to the addition of the polymer. The polymer coating also absorbs the fish attractant, preventing penetration into the lure.

Thus, there is a definite need for a scent attractant product that can penetrate the lure and therefore does not require constant reapplication, dries quickly, and does not result in an oily mess. This invention satisfies this need by utilizing a scent with a volatile solvent which is capable of penetrating the bait thereby causing the scent to penetrate the bait.

Products also exist that enable the fisherman to change the color of a variety of plastic baits. This is usually accomplished by dipping the lure into a volatile solvent containing a dye. The lure is immediately removed from the solution and allowed to dry. As soon as most of the solvent has evaporated, the lure will have a different color and can be used immediately. However, in this application, some of the residual solvent or even the dye can emit a chemical odor that is offensive to the fish. Thus, there also exists a definite need for a product that can be applied by the fisherman that can both change the color of a plastic bait and which adds a long-lasting scent attractant in one simple process. The present invention also satisfies this need by utilizing the volatile solvent and scent with a dye. The present invention also provides a combination of scent attractant, dye and a water-insoluble polymer in a volatile solvent which can be applied to metal or other non-penetrable lures thereby effectuating a color change and imparting scent to the lure in one quick and simple application.

SUMMARY OF THE INVENTION

The invention provides a composition for applying to a bait to attract fish or mask a scent on the bait, comprising: a masking or attracting scent capable of and in an amount sufficient to mask a scent on the bait or attract a fish; a suitable volatile solvent which is capable of dissolving the scent and capable of penetrating the bait thereby causing penetration of the scent into the bait for prolonged release of the scent; and in the substantial absence of a polymer. Preferably the solvent comprises between about 80–99.9% by weight of the composition, especially between about 90–99.5% by weight of the composition between about 97.5–99.5% by weight of the composition.

The present invention also provides a composition for or applying to a bait to attract fish or mask a scent on the bait comprising: a suitable solvent soluble dye; a masking or attracting scent capable of and in an amount sufficient to mask a scent on a bait or attract fish; and a suitable volatile solvent which is capable of dissolving the scent and capable of penetrating the bait thereby causing penetration of the scent and dye into the bait for prolonged release of the scent and a change in color of the bait.

Further, the present invention provides a composition for applying to a bait to attract fish or mask a scent on the bait comprising: a suitable solvent soluble dye; a masking or attracting scent capable of and in an amount sufficient to mask a scent on a bait or attract fish; a suitable water-insoluble polymer capable of forming a coating on the surface of the bait; and a suitable volatile solvent which is capable of dissolving the scent, the dye and the polymer such that a coating of scent, polymer and dye remains on the surface of the bait after evaporation of the solvent for prolonged release of the scent and a change in color of the bait.

DETAILED DESCRIPTION OF THE INVENTION

As used herein, "a" can mean one or more.

The invention provides a composition for applying to a bait to attract fish or mask a scent on the bait, comprising: a masking or attracting scent capable of and in an amount sufficient to mask a scent on the bait or attract a fish; a suitable volatile solvent which is capable of dissolving the scent and capable of penetrating the bait thereby causing penetration of the scent into the bait for prolonged release of the scent; and in the substantial absence of a polymer. Preferably the solvent comprises between about 80–99.9% by weight of the composition, especially between about 90–99.5% by weight of the composition between about 97.5–99.5% by weight of the composition.

As used herein, "attract" means to incorporate a scent into or onto a bait such that the scent is released and detected by a fish's olfactory organs to stimulate the "feed" response. By "mask" is meant to release a scent such that scents which are repulsive to a fish are less detectable by the fish.

As described herein, only "suitable" scents and solvents are within the scope of the invention. Thus, scents that are repulsive to a fish are not within the scope of the invention. Depending upon the selection of bait, e.g., a plastic worm, solvents which do not allow penetration into the bait for prolonged release of scent are not within the scope of the invention. Likewise, a suitable solvent for a metal lure (e.g., a spinner bait) does not substantially penetrate the lure surface, rather it is capable of dissolving the scent and/or dye and a water insoluble polymer and is capable of evaporation after application to the lure such that a coating of scent and/or dye and polymer remains on the surface of the lure for prolonged release of the scent and/or a change in color of the lure.

As used herein, "in the substantial absence of a polymer" means the composition does not contain an appreciable amount of any polymer. In certain embodiments of the present invention, e.g., compositions designed for coating plastic worms, the presence of a polymer in the composition would prevent penetration of the attractant into the bait or substantially increase the drying time of the attractant and is therefore undesirable.

The drying time for compositions of the subject invention is preferably less than one minute. More preferably, the drying time is less than 30 seconds, especially less than about 10 seconds.

The compositions of the present invention can be applied to any bait. By "bait" is meant anything used to attract and catch a fish, for example a lure, plastic worm, or a live bait. "Lure" is meant to include, but not be limited to, any plastic, wooden or metal object which attracts fish, e.g., spoons, spinner baits, top water plugs, rattlers, divers and the like.

The compositions of the present invention can be utilized in a variety of suitable applicators. A "suitable" applicator is one which preferably contains: a means to seal the container to prevent exposure of the composition to the atmosphere when the applicator is not in use; and a means for applying the composition to the bait. Examples of suitable applicators include, but are not limited to, a brush and bottle, a pump spray, an aerosol spray, a squeeze bottle, a valve-type marking pen, a roller ball pen, and a wick-type marking pen. Alternatively, the compositions can be applied by dipping the bait into a sealable container which contains the composition.

As used herein, "volatile" means a solvent which vaporizes or evaporates when exposed to air. In certain embodiments of the present invention, the suitable volatile solvents are those which are capable of penetrating into a plastic, polymer, or wooden bait rather than forming a coating on the surface of the bait. Such penetration allows the scent and/or dye, which penetrates with the solvent, to be more slowly released in water. In certain other compositions embodied by the present invention, e.g., compositions of scent, and/or dye containing water-insoluble polymers for applying to metal lures, the suitable volatile solvents do not substantially penetrate into the surface of the lure, rather they form a solution with the scent and/or dye, and the water-insoluble polymer which forms a coating on the lure surface as the solvent evaporates.

Many volatile solvents are available that have the unique capability to penetrate a variety of plastic and polymer lures such as polyvinylchloride (PVC), polystyrene, urethane, silicone and others. These solvents actually permeate into the plastic on contact and evaporate when exposed to the atmosphere. As the solvent permeates into the lure surface, dissolved molecules such as compatible fish attractants and/or solvent-soluble dyes permeate into the lure along with the solvent. The nonvolatile or very low volatile fish attractants and/or dyes remain with the plastic both on and below the surface after the solvent evaporates. Even though the fish attractants are considered nonvolatile, they do slowly evaporate over extended periods of time, releasing scent and taste that attract fish.

Acetone is a preferred example of a suitable solvent because of its fast evaporation characteristics and overall performance. Even though acetone is flammable, it has no harmful effects to the environment. When utilized in this invention, acetone dries in a matter of seconds, allowing for almost immediate use of the bait. When used in a fine-mist spray applicator for painted plastic or wood lures, it quickly dries with no blemishing effect to the coating.

Other suitable solvents include, but are not limited to, ketones such as methyl ethyl ketone, diethyl ketone, methyl acetone, and tetra hydro furan. Examples of esters include butyl acetate, ethyl acetate, methyl acetate, amyl acetate, and propyl acetate. Alcohols include methyl alcohol and ethyl alcohol. Chlorinated solvents such as methylene chloride, trichloroethane, trichloroethylene and perchloroethylene will also work. Toluene and xylene are two types of hydrocarbon solvents that will work. Although these solvents and others work, due to slow drying they are less preferred than acetone when the bait is dipped into the composition. However, when utilized in a fine mist spray, these solvents can be very effective. Alternatively, these solvents can be combined with more volatile solvents in azeotropic mixtures to achieve the desired evaporation times discussed herein, especially in applications which involve marking pens, brush or wick-type applicators and the like.

The scent attractant/masker, or combination of scent attractants/maskers which can be utilized in the compositions of the present invention include, for example, all scents presently utilized in the art including garlic oil, shrimp oil, anise oil, banana oil, artificial and natural fish or seafood oils or extracts of worms or fish, shrimp, crabs, clams or artificial equivalents. A concentrated form of attractant is preferred to give best results. However, if too much attractant is used, the excess may not penetrate the lure completely and may leave behind an undesirable residue after the solvent has evaporated.

One embodiment of the present invention comprises a scent attractant formulated into a volatile solvent, for the purpose of adding a penetrating scent attractant to a bait. This invention can also provide a combination of scent attractant, dye and volatile solvent designed to add a penetrating scent and cause a color change to a lure in a single process or application step. The combination of dye and scent attractant alleviates the problem of residual chemical odors left by dye and also adds a long-lasting scent attractant to the lure being treated.

Specifically, the present invention provides a composition for applying to a bait to attract fish or mask a scent on the bait comprising: a suitable solvent soluble dye; a masking or attracting scent capable of and in an amount sufficient to mask a scent on a bait or attract fish; and a suitable volatile solvent which is capable of dissolving the scent and the dye and capable of penetrating the bait thereby causing penetration of the scent and the dye into the bait for prolonged release of the scent and a change in color of the bait. The solvent soluble dye would readily be known to one skilled in the art and can be selected from the group consisting of basic, acid or solvent group of dyes. Common suitable examples include, but are not limited to, C.I Solvent Blue 35, C.I. Solvent Yellow 72, C.I. Solvent Red 24 and C.I. Solvent Yellow 33.

The present invention also provides a composition for applying to a bait to attract fish or mask a scent on the bait comprising: a suitable solvent soluble dye; a masking or attracting scent capable of and in an amount sufficient to mask a scent on a bait or attract fish; a suitable water insoluble polymer capable of forming a coating on the surface of the bait; and a suitable volatile solvent which is capable of dissolving the scent, the dye and the polymer such that a coating of scent, dye and polymer remains on the surface of the bait after evaporation of the solvent for prolonged release of the scent and a change in color of the bait. For baits and lures such as metal spoons, jigs, and spinner baits, the aforementioned composition coats the surface of the lure with a water-insoluble polymer combined with scent and dye in one easy application step. The scent and dye can be incorporated into the polymer matrix or interspersed among the porus structure of the polymer. The scent is released slowly by the abrading action of the water and by contact with other obstacles in the water during retrieval of the lure following a cast. There are many water-insoluble polymers which can be utilized in the composition described above including, but not limited to, styrinated acrylics, polyurethanes, plastic resins and the like.

In certain other embodiments, the present invention provides an azeotropic mixture of solvents in amounts sufficient to achieve a predetermined drying (evaporation) time for the mixture after the composition is applied to a bait. Depending upon the choice of baits, the type of applicator, and the components of the composition (e.g., the choice dyes and/or polymers), the drying time for the compositions of the present invention (evaporation time of the solvent) can be increased or decreased to a desired predetermined time by preparing an azeotropic mixture of solvents with different boiling points. As used herein, "azeotropic mixture of solvents" means a mixture of solvents which maintains a constant boiling point. The boiling point of a mixture of solvents can be adjusted upward by adding a solvent with a higher boiling temperature. Likewise, the boiling point (and hence the evaporation or drying time) of a solvent mixture can be decreased by adding a solvent with a lower boiling point (more volatile).

Thus, by utilizing optimization procedures and methods known in the art, one can adjust the evaporating times for the compositions of the present invention to meet the specific needs of the situation by increasing or decreasing the boiling point of the mixture. Examples of solvents which can be utilized to form an azeotropic mixture include, but are not limited to, ketones such as acetone; alcohols such as ethanol; glycol ether solvents such as propyl cellosolve, methyl cellosolve, and butyl cellosolve; chlorinated solvents; hydrocarbon solvents; and the like.

When the compositions of the present invention are to be utilized as a dip or spray solution for applying to plastic or wooden lures, the drying time should be short (e.g., less than about 10 seconds) to prevent substantial damage to the structural integrity of the lure. Acetone is one example of a volatile solvent which works well for these methods of application for the reasons stated herein. However, for wick-type applicators, marking pens and the like, acetone can be combined with a less volatile solvent to form an azeotropic mixture to adjust the evaporation time upward thereby increasing the useful life of the composition in the applicator. For example, acetone, which has a boiling point of about 145° F., can be admixed with propyl cellosolve, which boils at about 304° F., to form an azeotropic mixture with a predetermined drying time of between about 2 and 30 seconds. The mixture can comprise acetone in an amount from between about 0 vol % and 50 vol % of the mixture and propyl cellosolve from between about 0 vol % and 50 vol % of the mixture.

In a presently preferred embodiment the invention provides a mixture wherein acetone comprises between about 15 vol % and 20 vol % and propyl cellosolve comprises between about 80 vol % and 85 vol % of the mixture. The ratios of solvents in the compositions described herein can vary depending upon the desired drying time and choice of applicator such that the drying time can range from between about one minute to about one second, preferably less than about 30 seconds, especially less than about 10 seconds.

The following examples are intended to illustrate but not limit the invention. While they are typical of those that might be used, other procedures known to those skilled in the art may be alternatively employed. In particular, any of the above alternative formulations can be substituted for the formulations used in the Examples.

EXAMPLE I

A formulation of a garlic-scented penetrating attractant is composed of the following ingredients and percentages: garlic oil (substantially pure) (Berjé, Bloomfield, N.J.), 0.5% by weight; and acetone, 99.5%. When applied, the garlic attractant remained in the bait for extended time periods.

EXAMPLE II

A formulation of an anise scented penetrating attractant is composed of the following ingredients and percentages: anise oil, 2.5% by weight; and acetone, 97.5%. When applied, the formulation remained in the bait for extended time periods.

EXAMPLE III

A formulation of a garlic scented penetrating attractant with a red dye is composed of the following ingredients and percentages: garlic oil, 0.5% by weight; C.I. Solvent Red. 24, 0.4%; and acetone, 99.1%. When applied, the formulation remained in the bait for extended time periods and the bait was dyed red.

EXAMPLE IV

A formulation of a nonflammable anise scented penetrating attractant with a blue dye is composed of the following ingredients and percentages: anise oil, 2.5% by weight; C.I. Solvent Blue 35, 0.5%; and 1,1,1 trichloroethane, 97%. When applied, the formulation remained in the bait for extended time periods and the bait was dyed blue.

EXAMPLE V

A formulation of a garlic scented non-penetrating attractant and dye for coating metal baits is comprised of the following ingredients and percentages: 0.5% garlic; 1% Solvent Blue 35; 15% acrylic resin; and 83.5% acetone. This formulation is applied directly to the bait surface, forming a water-insoluble coating which slowly releases scent. The concentration of resin can vary from between about 50–25% by weight thereby varying the thickness of the resin coating. The solvent can vary between about 70–90% by weight depending upon the amount of resin selected. Alternatively, an azeotropic mixture of solvents as described herein can be utilized to create an optimal drying time.

EXAMPLE VI

An example of an application by dipping consists of adding any of the above formulations in a bottle (normally two ounces) and dipping a lure such as a plastic worm partially into the liquid-filled container. The worm is immediately removed and allowed by dry for a few seconds. After drying, an odor is very apparent and remained for extended periods. Also a color change was observed if a dye/scent combination was used.

EXAMPLE VII

Any example of an application by non-aerosol spraying consists of adding any of the above formulations to a fine-mist spray bottle and spraying a mist on the lure of choice. Drying takes a few seconds, as shown in Example V.

EXAMPLE VIII

An example of a garlic scented formulation containing a red dye designed for utilization in a wick-type marking pen comprises: garlic oil, 2.0% by weight; solvent red 24 dye, 1.5%; acetone, 15%; and propyl cellosolve, 81.5%. The azeotropic mixture of acetone and propyl cellosolve at the above concentrations results in a drying time of about 2–6 seconds when the composition is applied to a bait. The azeotropic mixture also optimizes the rate of delivery of the composition from the marking pen and enhances the effective life of the marking pen by controlling evaporation from the wick surface.

The formulation described in Example VIII can be placed in any of a number of commercially available wick-type markers. One example is the jumbo wick-type marker which can be obtained from Wilpak (King of Prussia, Pa.).

Although the present processes have been described with reference to specific details of certain embodiments thereof, it is not intended that such details should be regarded as limitations upon the scope of the invention except as and to the extent that they are included in the accompanying claims.

What is claimed is:

1. A composition in, the substantial absence of a polymer, for application to a bait to attract fish or mask a scent on the bait, comprising:
    a) a masking or attracting scent present in an amount sufficient to mask a scent on the bait or attract a fish; and
    b) a suitable volatile solvent which is capable of dissolving the scent and capable of penetrating the bait thereby causing penetration of the scent into the bait for prolonged release of the scent.

2. The composition of claim 1, wherein the solvent comprises between about 80–99.9% by weight of the composition.

3. The composition of claim 1, wherein the solvent comprises between about 97.5–99.5% by weight of the composition.

4. The composition of claim 1, wherein the scent is selected from the group consisting of earthworm extract, a fish scent, a seafood scent, and an oil.

5. The composition of claim 4, wherein the oil is selected from the group consisting of garlic oil, anise oil and banana oil.

6. The composition of claim 1, wherein the solvent is selected from the group consisting of a ketone, an alcohol, a chlorinated solvent and a hydrocarbon solvent.

7. The composition of claim 1, wherein the solvent is selected from the group consisting of acetone, 1,1,1 trichloroethane, methyl ethyl ketone, toluene and xylene.

8. The composition of claim 1, wherein the volatile solvent is in an azeotropic mixture of solvents in amounts sufficient to achieve a predetermined evaporation time for the mixture after the composition is applied to a bait.

9. The composition of claim 8, wherein the solvents are selected from the group consisting of a ketone, an alcohol, an ester, an ether, a fluorohydrocarbon, a chlorinated solvent, a glycol ether, and a hydrocarbon solvent.

10. The composition of claim 9, wherein the solvents are acetone and propyl cellosolve.

11. The composition of claim 1, applied to a bait.

12. The composition of claim 1, wherein the bait is a plastic worm.

13. The composition of claim 1, in a suitable applicator.

14. The composition of claim 13, wherein the applicator is selected from the group consisting of a brush and bottle, a pump spray, an aerosol spray, a squeeze bottle, a valve-type marking pen, a roller ball pen, and a wick-type marking pen.

15. A composition for application to a bait to attract fish or mask a scent on the bait comprising:
    a) a suitable solvent soluble dye;
    b) a masking or attracting scent present in an amount sufficient to mask a scent on a bait or attract fish:
    c) a suitable volatile solvent which is capable of dissolving the scent and the dye; and,
    d) a suitable water insoluble polymer capable of forming a coating on the surface of the bait.

16. The composition of claim 15, wherein the water-insoluble polymer is selected from the group consisting of styrinated acrylic, polyurethane and plastic resin.

17. The composition of claim 15, wherein the solvent soluble dye is selected from the group consisting of: C.I. Solvent Blue 35, C.I. Solvent Yellow 72, C.I. Solvent Yellow 33, and C.I. Solvent Red 24.

18. The composition of claim 15, wherein the solvent comprises between about 75% and 99% by weight of the composition.

19. The composition of claim 18, wherein the dye comprises between about 0.5% and 5% by weight of the composition and the scent comprises between about 0.5 % and 5% by weight of the composition.

20. The composition of claim 19, wherein the scent is selected from the group consisting of earthworm extract, a fish scent, a seafood scent, and an oil.

21. The composition of claim 20, wherein the oil is selected from the group consisting of garlic oil, anise oil and banana oil.

22. The composition of claim 19 in a wick-type marking pen.

23. The composition of claim 15, wherein the solvent is selected from the group consisting of a ketone, an alcohol, a chlorinated solvent and a hydrocarbon solvent.

24. The composition of claim 15, wherein the solvent is selected from the group consisting of acetone, 1,1,1 trichloroethane, methyl ethyl ketone, toluene and xylene.

25. The composition of claim 15, wherein the volatile solvent is in an azeotropic mixture of solvents in amounts sufficient to achieve a predetermined evaporation time for the mixture after the composition is applied to a bait.

26. The composition of claim 25, wherein the solvents are selected from the group consisting of a ketone, an alcohol, an ester, an ether, a fluorohydrocarbon a chlorinated solvent, a glycol ether, and a hydrocarbon solvent.

27. The composition of claim 26, wherein the solvents are acetone and propyl cellosolve.

28. The composition of claim 15, applied to a bait.

29. The composition of claim 15, wherein the bait is a plastic worm.

30. The composition of claim 15 applied to a metal lure.

31. The composition of claim 15, in a suitable applicator.

32. The composition of claim 31, wherein the applicator is selected from the group consisting of a brush and bottle, a pump spray, an aerosol spray, a squeeze bottle, a valve-type marking pen, a roller ball pen, and a wick-type marking pen.

* * * * *